Oct. 10, 1961 S. T. ALLISON 3,003,779
VEGETABLE HARVESTER TYPE VEHICLE
Filed Nov. 16, 1959 2 Sheets-Sheet 1

INVENTOR
Stanley T. Allison
BY
AGENT

Oct. 10, 1961 S. T. ALLISON 3,003,779
VEGETABLE HARVESTER TYPE VEHICLE
Filed Nov. 16, 1959 2 Sheets-Sheet 2

INVENTOR
Stanley T. Allison

BY
AGENT

United States Patent Office 3,003,779
Patented Oct. 10, 1961

3,003,779
VEGETABLE HARVESTER TYPE VEHICLE
Stanley T. Allison, 8800 S.E. Sunnyside Road,
Portland, Oreg.
Filed Nov. 16, 1959, Ser. No. 853,267
2 Claims. (Cl. 280—32.5)

This invention comprises an improved novel and useful low slung automotive carriage for a gardener engaged in setting, weeding, transplanting, thinning or harvesting garden vegetables such as asparagus or the like.

The primary object of this invention is to provide a dirigible, automotive carriage which can be placed under complete pedal control of the operator while he sits comfortably astraddle a vegetable row with both hands free for their gardening purpose.

This application is a continuation in part of my copending application S.N. 516,713, filed June 20, 1955, "Vegetable Harvester," now abandoned.

It is well known that many different designs of power driven creepers, tractors, pickers, etc., have been built with a measure of success for specific agricultural purposes but, so far as known, none of the prior art devices are capable of symmetrical pedal management by the operator while he faces forwardly astraddle a crop row with clear vision of the vegetable row ahead.

It is a second object of this invention to provide such a device in which the frame is always aimed with its fore and aft centerline in the direction of travel of the carriage and in which the operator is located on that centerline facing forwardly to guide the carriage along the vegetable row he is working.

It is a third object to provide such a carriage in which the front wheel supporting structure is offset above the eye level of the operator and to the side of the carriage to give the operator an entirely clear and free front view of his forwardly advancing work area over at least forty five degrees laterally on either side of the center line of the vehicles and from the ground directly beneath his eyes to above his eye level.

It is a fourth object to provide the carriage with a pair of laterally spaced differentially driven, individually braked rear wheels and a pair of laterally spaced separately caster mounted front wheels.

It is a fifth object to provide a pair of pedal means selectively operable by one foot of the operator to operate respective ones of the rear wheel brakes to turn the carriage laterally about the rear wheel being braked.

It is a sixth object to provide a single pedal means operable by the other foot of the operator in one direction from an idling position first to engage the carriage driving engine to the differential drive shaft to drive the rear wheels and thereafter on further movement in the same direction to increase the speed of travel of the carriage.

It is a seventh object to provide independently laterally spaced supporting means for the respective caster mountings of the front wheels whereby the vertically extending caster axles of said wheel supporting means are instantaneously oppositely vertically movable to accommodate the carriage to ground elevation variations at the caster wheels without material variation of elevation of the operator's seat from the ground.

How these and other objects are attained is explained in the following description referring to the attached drawing in which.

Like reference numerals refer to like parts in the several figures of the drawing.

Figure 1:
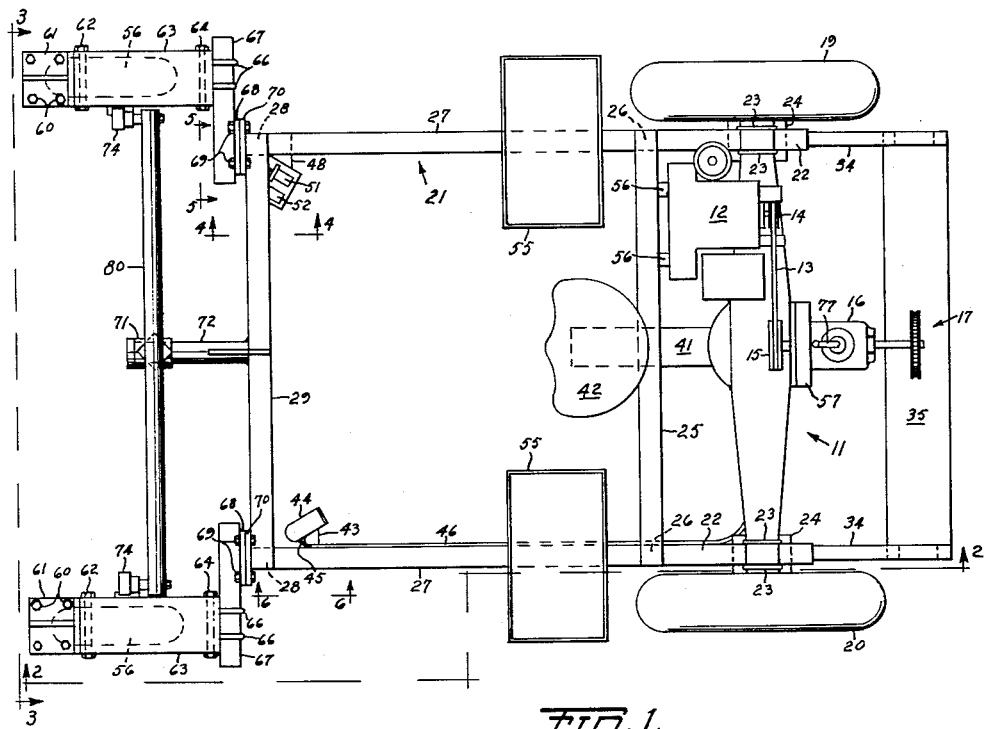
FIG. 1 is a top plan view of a preferred form of the harvester of this invention.
Figure 2:
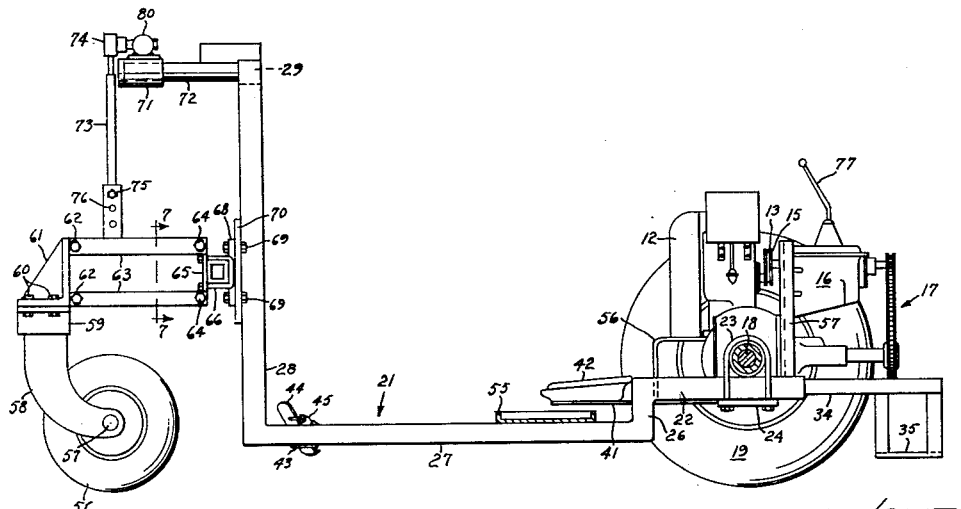
FIG. 2 is a side elevation in partial section viewed from the line 2—2 of FIG. 1.
Figure 3:
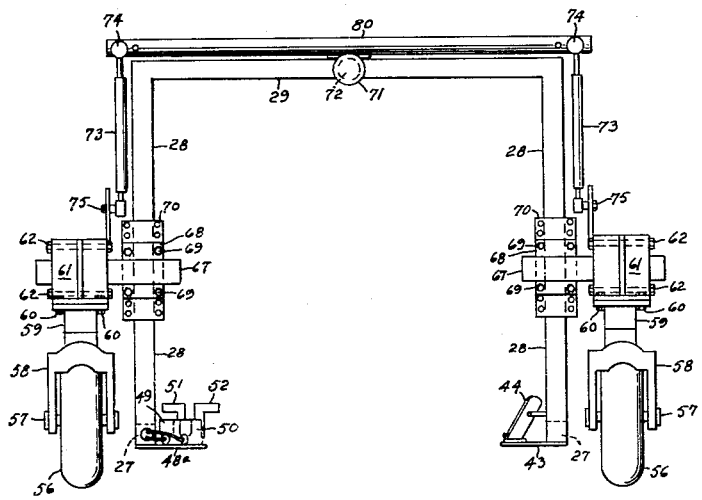
FIG. 3 is a fragmentary front elevation viewed from the line 3—3 of FIG. 1.
Figure 6:
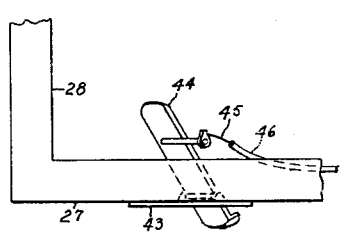
FIG. 6 is a fragmental view in partial section along the line 6—6 of FIG. 1.
Figure 4:
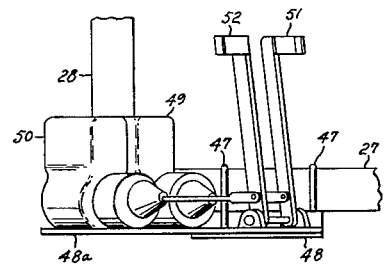
FIG. 4 is a fragmental view in partial section along the line 4—4 of FIG. 1.
Figure 7:
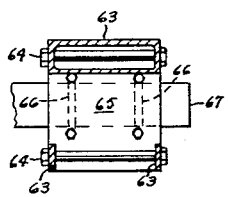
FIG. 7 is a fragmental view in partial section along the line 7—7 of FIG. 2.

Referring now to the drawing, indicated generally at 11 is shown a typical rear axle and differential drive gear housing assembly well known in the art and requiring no detailed description. It is to be understood, however, that a commonly used and well known type of small gasoline engine 12 is connected by a V-belt 13 and a pair of sheaves 14, 15, which include an automatic clutch, not shown, to a common type of automobile speed changing transmission 16. The output shaft of the transmission 16 is connected through chain and sprocket set 17 to the rear axle drive shaft 18 which differentially drives the rear wheels 19 and 20 in the well known manner of the common automobile. The rear axle housing 11 and wheels 19, 20 are equipped with automobile type hydraulic brakes for the details of which reference is made to 1957 Chevrolet passenger car shop manual RS-60-54M, copyright 1956, by the General Motors Corporation, Detroit, Michigan.

The carriage frame indicated generally as 21 is shown to be of hollow, welded, restangular tube construction, although it can be made of other structural shapes as desired, is seen to have a pair of laterally spaced parallel rear end members 22 underhung on rear axle housing 11, as shown, by U-bolts 23 and plates 24. At their forward ends members 22 of frame 21 are connected to tie member 25 and connected to the upper ends respectively of parallel vertical side members 26 to the bottom ends respectively of which are connected to horizontal parallel low side frame members 27, the forward ends respectively of which connect to the lower ends of front vertical side members 28, the upper ends respectively of which are connected by frame member 29.

Bar 41 positioned as shown and secured to rear axle housing 11 and tie member 25 carries at its front end, seat 42 conveniently positioned for the harvester operator.

Plate 43 welded to lower side member 27 hingedly supports, as shown, engine throttle foot pedal 44 conveniently positioned for the operator's left foot. Push-pull throttle wire 45 supported in conduit 46 extends along the harvester frame members to the engine where it controls the fuel throttle of the engine as pedal 44 is manipulated by the operator.

Figure 5:
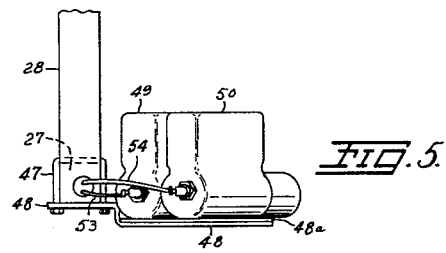
FIG 5 is a fragmental view in partial section along the line 5—5 of FIG. 1.

Secured under the other lower side member 27 as by U-bolts 47 is plate 48 supporting plate 48a on which is secured a pair of rear wheel hydraulic brake master cylinders 49, 50 with their operating pedals 51, 52, respectively adapted to operate the hydraulic brakes, not shown, of the right and left rear wheels. The respective hydraulic brake fluid lines 53, 54 leave the master cylinders as shown in FIG. 5 and enter the adjacent frame members 27, reappearing from the appropriate frame members 22 near their respective rear wheels.

Crate supports 55 secured respectively to frame members 27 are for the purpose of supporting portable lugs or crates into which the harvested vegetables are gathered from the ground by the harvester operator.

As is obvious from the drawing the engine and transmission parts of the drive of this harvester are, per se, no part of this invention, the parts having been selected from available material most suitable for my purpose. For instance, for the purpose of my inventive concept here disclosed, a differential rear wheel drive is required and the common automobile differential rear axle 11 is well adapted to the purpose. The engine is a common type of small air cooled engine adapted to be speed controlled by the throttle wire 45. Since in transport use the vehicle will want to travel much faster than in field use, it is convenient to use a conventional automobile transmission which also gives a reverse drive when needed. However, the conventional gear shift is used to select a top speed required for a particular use of the carriage and in the selected use the carriage is started, varied in speed and stopped all by the manipulation of the single throttle control pedal 44. Although the V-belt and sheave drive 13, 14, 15 from the engine to the transmission is a common commercial drive, it should be explained that there is an automatic centrifugal clutch built into engine sheave 14 which operates to pick up and drive the sheave when the engine comes up to a preset speed and to drop the sheave when the engine speed drops below a selected speed. Throttle pedal 44 therefore also is a speed clutch pedal since when the engine slows it is disconnected from the load and is again reconnected to the load by being speeded up. Combined engine sheave and centrifugal clutch 14 can be supplied by several different manufacturers; the one here preferred is the Mercury clutch made by the Mercury Clutch Division of Automatic Steel Products, Inc., 1201 Camden Ave., S.W., Canton 6, Ohio. The engine 12 is seen to be supported on rear axle housing 11 and tie member 25 by bent straps 56 while arch 57 supports transmission 16 from housing 11.

A particular feature of the present form of my invention is the novel, useful and exceedingly effective clear view design of the front end of the frame making possible the independent mounting for vertical motion of the vertically parallel laterally spaced castering axles of the front wheel and the remote rocking beam linkage for causing the caster wheels to move in instantaneous vertical opposition for the purpose of minimizing the effect of unevenness of the ground under the front wheels on the vertical stability of the carriage along the vegetable row being worked.

Front horizontal member 29 connecting the laterally spaced vertical members 28 is seen to be so placed as to leave the entire front end of the carriage free of obstruction to the wide angle forward view of the operator to a distance well above his eye level.

Each of the similar front wheels 56 are similarly rotatably supported by axles 57 on caster yokes 58 having respective vertical axles, not shown, rotatably supported in caster bearings 59 secured by bolts 60 to bearing brackets 61 supported by rotatable pins 62 on parallel motion links 63 the other ends of which are supported by rotatable pins 64 on stationary brackets 65 secured by U-bolts 66 to frame stubs 67 welded to plates 68 vertically positionable as desired by bolts 69 on plates 70 welded respectively to vertical frame members 28. Walking beam 80 is rotatably supported at its midlength by bearing 71, welded thereto, on journal 72 forwardly horizontally secured to frame member 29 at its midlength, as shown.

The respective top ends of pivot links 73 are pivotally secured as at 74 to the respective opposite ends of walking beam 80 and the respective bottom ends of pivot links 73 are rotatably secured to journal pins 75 vertically positioned as desired in holes 76 of adjustment bars welded to top links 63.

In setting or harvesting row crops like asparagus for which this harvester is especially adapted it should be noted that the crop rows are, either singly or in groups, to be spaced four to six feet apart since the rear wheels 19, 20 of the harvester are spaced about four and one-half feet apart and the front wheel casters are centered about six feet apart.

To use the harvester the operator first sets the transmission lever 77 to its neutral position and starts the engine in the usual manner. Then when the engine is running smoothly the operator adjusts the engine throttle until the engine is idling below the pick up speed of the clutch in drive sheave 14 and moves lever 77 to set the transmission to the speed range desired. The operator then sits down on seat 42 with his left foot positioned to manipulate throttle control pedal 44 and his right foot positioned to control either right wheel brake pedal 51 or left wheel brake pedal 52.

Steering to the left by pressing left wheel brake pedal 52 or to the right by pressing right wheel brake pedal 51, going forward at a desired speed or stopping by manipulating engine throttle control pedal 44, the operator moves the tractor to a position astraddle the row he intends to work and proceeds with his job of planting, weeding or harvesting as the case may be. Whenever all pressure is removed from throttle pedal 44 the clutch in sheave 14 disconnects the engine from the transmission and if desired the operator can turn in his seat and shift transmission lever 77 to any available forward speed range or reverse.

It is a feature of the invention that most of the weight of the carriage and its load is on the rear wheels which are brake controlled and thereby differentially driven to control the forward direction of travel of the carriage. The further easing of steering by lessening the brake torque load on the front wheels can be accomplished by inserting rearwardly extending beams 34 into the open ends of rear sections 22 of frame 21 and supporting a shelf 35 thereon to be loaded as desired. The necessary weight adjustment can be made by moving beams 34 and shelf 35 forward or back or by shifting the harvested produce to shelf 35.

The preferred form of my invention as here disclosed includes the particular form of caster mounting of the front wheel to afford the operator of the harvester the completely open forward view in order that without taking his eyes off his work he is always visually conscience of the working conditions he is approaching.

Having thus listed some of the objects of my invention, illustrated and described a preferred form in which my invention may be practiced and explained its use, I claim:

1. A work carriage for a gardener sitting thereon while manually harvesting asparagus from the ground between his legs along the center plane of said carriage, said carriage comprising a frame including a similar pair of side frame members symmetrically laterally spaced on either side of said centerplane, each of said side frame members including a lower rearwardly extending element and a forward vertically extending element together with a rear cross tie element laterally connecting said rearwardly extending elements towards the rear ends thereof and a high cross tie element laterally connecting said upwardly extending elements near the tops thereof and a forward facing seat for said gardener supported on said frame at said centerplane near said rear cross tie element of said frame whereby said gardener at his work on said seat has a clear level forward view between the ground, said high cross tie element and said two laterally spaced vertically extending side elements, said carriage including a pair of widely, laterally spaced parallel rear wheels and a widely laterally spaced pair of front wheels, caster means for independently caster mounting each of said spaced front wheels for rotations about a respective vertical axle in the plane of its wheel, means for attaching each of said caster means on a respective one of said vertical frame elements for axial movement of its respective vertical axle thereon and lever means laterally rockably supported on said high cross tie element with its ends respectively linked to said respective means for attaching said caster means on said vertical frame elements, whereby when said front wheels are moved forwardly with the said frame said front wheels will be steered horizontally by said vertical axles and said vertical axles will be moved vertically oppositely by said front wheels.

2. An automotive carriage to be ridden by an operator thereof for harvesting vegetables, said carriage comprising a differential rear axle enclosed in a rear axle housing supported on a pair of rear wheels attached to the ends of said axle, each of said wheels being equipped with an independent brake, a frame for said carriage, said frame including a pair of laterally spaced side members supported at their rear ends by said rear axle housing and connecting at their front ends respectively with the respective lower ends of a pair of laterally spaced upstanding frame members, a forward looking operator's seat supported between said side frame members ahead of and below said rear axle housing, a laterally extending upper frame member above the line of horizontal vision of an operator on said seat laterally supporting the upper ends of said upstanding frame members whereby said operator will have clear vertical distance vision between said upper frame member and the ground and wide lateral angle forward vision between said laterally spaced upstanding frame members, said carriage including a pair of front wheels with independent means caster mounting said respective front wheels for rotation about respective widely laterally spaced vertical axles in the respective planes of said wheels and means for supporting said vertical axles on said frame for simultaneous opposite vertical axial movement, said means for supporting said vertical axles of said caster mounting means including for each of said axles a bearing means, a pair of parallel links with equally vertically spaced adjacent ends, means rotatably securing one pair of adjacent ends of said links to said frame and rotatably securing the other ends of said links to said bearing means, the axes of rotation of said four ends of said pair of links being parallel, and rocking means pivoted on said frame with one end linked to one of said parallel links of one of said axles and the other end linked to one of said parallel links of the other of said axles.

References Cited in the file of this patent
UNITED STATES PATENTS

| | | |
|---|---|---|
| 2,404,121 | Black | July 16, 1946 |
| 2,511,692 | Brown | June 13, 1950 |
| 2,520,835 | England | Aug. 29, 1950 |
| 2,583,358 | Cesan | Jan. 22, 1952 |
| 2,818,930 | Kucera | Jan. 7, 1958 |